(12) United States Patent
Dangelmaier et al.

(10) Patent No.: US 9,797,319 B2
(45) Date of Patent: Oct. 24, 2017

(54) HANDHELD WORK APPARATUS

(71) Applicant: Andreas Stihl AG & Co. KG, Waiblingen (DE)

(72) Inventors: Manuel Dangelmaier, Plochingen (DE); Tim Gegg, Remseck (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 612 days.

(21) Appl. No.: 13/758,607

(22) Filed: Feb. 4, 2013

(65) Prior Publication Data
US 2013/0199812 A1 Aug. 8, 2013

(30) Foreign Application Priority Data

Feb. 4, 2012 (DE) .................. 10 2012 002 225

(51) Int. Cl.
| | |
|---|---|
| B23Q 5/00 | (2006.01) |
| F02D 31/00 | (2006.01) |
| F02P 5/15 | (2006.01) |
| F02P 9/00 | (2006.01) |

(Continued)

(52) U.S. Cl.
CPC ........... *F02D 31/00* (2013.01); *F02D 31/001* (2013.01); *F02D 31/009* (2013.01); *F02D 37/02* (2013.01); *F02P 5/1502* (2013.01); *F02P 9/005* (2013.01); *F02D 31/006* (2013.01); *F02D 41/0087* (2013.01); *F02D 2200/602* (2013.01);

(Continued)

(58) Field of Classification Search
CPC ...... F02D 31/00; F02D 31/002; F02D 31/006; F02D 31/009; F02D 35/0053; F02D 37/02; F02D 41/0002
USPC .................................................... 173/179, 213
See application file for complete search history.

(56) References Cited

U.S. PATENT DOCUMENTS

| | | | | |
|---|---|---|---|---|
| 3,650,099 A | * | 3/1972 | Sitter .................... | A01D 46/26 56/340.1 |
| 3,660,671 A | * | 5/1972 | Peterson .................. | H02P 9/08 290/1 R |
| 3,710,215 A | | 1/1973 | Johnston | |

(Continued)

FOREIGN PATENT DOCUMENTS

| | | |
|---|---|---|
| DE | 10 2007 046 111 A1 | 4/2009 |
| EP | 0 283 945 A2 | 9/1988 |

(Continued)

OTHER PUBLICATIONS

"Die Asynchronmaschine Theorie Teil 1", Power Electronic Systems Laboratory, Swiss Federal Institute of Technology, Zurich, pp. 3 to 27, with an internet archive citation showing a date of Jul. 5, 2010.

*Primary Examiner* — Robert Long
(74) *Attorney, Agent, or Firm* — Walter Ottesen, P.A.

(57) ABSTRACT

A handheld work apparatus has a combustion engine (4) for driving a tool. The combustion engine (4) has an ignition device, a device for metering fuel and a control device (31). The control device (31) engages when an engagement speed ($n_{E1}$, $n_{E2}$) is reached, in order to limit the speed (n) of the combustion engine (4). In order to allow the speed (n) to be set in an easy manner at full throttle, the work apparatus has a device for setting the engagement speed ($n_{E2}$) by the user.

20 Claims, 3 Drawing Sheets

(51) Int. Cl.
*F02D 37/02* (2006.01)
*F02D 41/00* (2006.01)

(52) U.S. Cl.
CPC .... *F02D 2200/604* (2013.01); *F02D 2400/06* (2013.01); *Y02T 10/46* (2013.01)

(56) References Cited

U.S. PATENT DOCUMENTS

| | | | |
|---|---|---|---|
| 4,979,477 A | 12/1990 | Nickel et al. | |
| 5,035,115 A * | 7/1991 | Ptasinski | F01B 29/06 60/514 |
| 5,211,144 A | 5/1993 | Collins et al. | |
| 5,394,857 A * | 3/1995 | Yamakawa | F02D 41/065 123/491 |
| 5,473,875 A * | 12/1995 | Zehavi | A01D 46/26 56/340.1 |
| 5,852,998 A * | 12/1998 | Yoshioka | F02B 61/045 123/491 |
| 6,095,120 A * | 8/2000 | Neugebauer | F02D 41/061 123/478 |
| 6,474,300 B1 * | 11/2002 | Steffen | E01C 19/30 123/198 D |
| 6,672,044 B1 * | 1/2004 | Zehavi | A01D 46/26 56/340.1 |
| 6,700,212 B2 | 3/2004 | Ackermann et al. | |
| 6,928,362 B2 * | 8/2005 | Meaney | F02D 41/2435 701/115 |
| 7,538,503 B2 | 5/2009 | Machens et al. | |
| 7,652,438 B2 | 1/2010 | Rosskamp | |
| 7,905,217 B2 * | 3/2011 | Namari | F02D 41/062 123/179.17 |
| 7,983,830 B2 | 7/2011 | Yu et al. | |
| 8,322,326 B2 | 12/2012 | Gegg et al. | |
| 8,380,421 B2 | 2/2013 | Yu et al. | |
| 8,418,891 B1 * | 4/2013 | Harris | A23G 3/28 222/333 |
| 8,457,865 B2 | 6/2013 | Geyer | |
| 8,639,430 B2 | 1/2014 | Yu et al. | |
| 8,723,453 B2 | 5/2014 | Rosskamp et al. | |
| 9,400,742 B2 * | 7/2016 | Miyaki | F02D 41/042 |
| 9,567,934 B2 * | 2/2017 | Rodriguez | F02D 41/064 |
| 2001/0010267 A1 * | 8/2001 | Kawarai | B25B 23/1453 173/180 |
| 2002/0100438 A1 | 8/2002 | Raffenberg et al. | |
| 2003/0178211 A1 * | 9/2003 | Uhl | B23B 45/048 173/48 |
| 2004/0090195 A1 * | 5/2004 | Motsenbocker | B63B 43/18 318/109 |
| 2004/0134175 A1 * | 7/2004 | Osborne | A01D 34/006 56/10.6 |
| 2004/0134961 A1 * | 7/2004 | Wolf | B25C 1/08 227/10 |
| 2004/0182587 A1 * | 9/2004 | May | B25B 23/14 173/2 |
| 2004/0263101 A1 | 12/2004 | Kolomeitsev et al. | |
| 2005/0004736 A1 * | 1/2005 | Belcher | B60K 31/04 701/50 |
| 2005/0230130 A1 * | 10/2005 | Strasser | B25F 5/00 173/2 |
| 2006/0086337 A1 * | 4/2006 | Nickel | F02D 31/001 123/335 |
| 2006/0290304 A1 | 12/2006 | Marcinkiewicz et al. | |
| 2007/0085496 A1 * | 4/2007 | Philipp | A61B 17/151 318/139 |
| 2007/0182350 A1 | 8/2007 | Patterson et al. | |
| 2007/0205732 A1 | 9/2007 | Beifus | |
| 2008/0011251 A1 * | 1/2008 | Tanaka | B25C 1/08 123/46 SC |
| 2008/0041146 A1 * | 2/2008 | Leufen | F02D 41/24 73/116.02 |
| 2009/0018745 A1 * | 1/2009 | Prasetiawan | E02F 9/166 701/99 |
| 2010/0108736 A1 * | 5/2010 | Tanaka | B25C 1/08 227/10 |
| 2010/0218966 A1 | 9/2010 | Liebhard et al. | |
| 2010/0224384 A1 * | 9/2010 | Gwosdz | B25F 5/02 173/217 |
| 2010/0243699 A1 * | 9/2010 | Largo | B25C 1/08 227/2 |
| 2011/0234133 A1 | 9/2011 | Hano et al. | |
| 2011/0284255 A1 * | 11/2011 | Ookubo | B23B 45/02 173/109 |
| 2012/0060642 A1 | 3/2012 | Yamaguchi et al. | |
| 2012/0168189 A1 * | 7/2012 | Eckert | B25B 21/00 173/1 |
| 2012/0193112 A1 * | 8/2012 | Gwosdz | F02D 31/009 173/1 |
| 2012/0312570 A1 * | 12/2012 | Wanek | B25B 21/00 173/1 |
| 2013/0137548 A1 | 5/2013 | Velamakanni et al. | |
| 2013/0200837 A1 | 8/2013 | Oerding et al. | |
| 2014/0084704 A1 * | 3/2014 | Yanagihara | B25F 5/00 307/109 |
| 2014/0096986 A1 * | 4/2014 | Hirabayashi | B27B 17/08 173/2 |
| 2015/0345460 A1 * | 12/2015 | Eichler | B25F 5/00 701/113 |
| 2016/0144495 A1 * | 5/2016 | Raggl | B25C 1/08 29/432 |

FOREIGN PATENT DOCUMENTS

| | | |
|---|---|---|
| JP | 62293990 A | 12/1987 |
| WO | 2009/044934 A1 | 4/2009 |

* cited by examiner

HANDHELD WORK APPARATUS

CROSS REFERENCE TO RELATED APPLICATION

This application claims priority of German patent application no. 10 2012 002 225.5, filed Feb. 4, 2012, the entire content of which is incorporated herein by reference.

FIELD OF THE INVENTION

The invention relates to a handheld work apparatus having a combustion engine for driving a tool. The combustion engine includes an ignition device, a fuel-metering device and a control unit. The control unit intervenes when the combustion, engine reaches an engagement rotational speed to limit the rotational speed of the engine.

BACKGROUND OF THE INVENTION

U.S. Pat. No. 8,322,326 discloses a combustion engine for a handheld work apparatus, wherein the speed is limited when an engagement speed is reached.

In handheld work apparatuses, continuous operation with a reduced speed, that is to say a speed below the full load speed, can be advantageous. This is the case for example in harvesters, in which it is advantageous to set the speed depending on the degree of ripeness of the fruits to be harvested and the strength of the branches to be shaken. Operation with a reduced speed can also be desirable for reducing noise. Hitherto, the user has had to set the desired speed by partially pressing the throttle lever. This is awkward for the user, since the throttle lever has to be held continuously in a partially pressed position. It is also known to fix the throttle lever in selected positions.

SUMMARY OF THE INVENTION

It is an object of the invention to provide a handheld work apparatus of the kind described above wherein it is possible to set the speed in an easy manner.

The portable hand-guided work apparatus of the invention includes: a tool; a combustion engine for driving the tool; the combustion engine having an ignition device, a fuel-metering device and a control unit; the control unit being configured to intervene when the combustion engine reaches an engagement rotational speed ($n_{E1}$, $n_{E2}$) to limit the rotational speed (n) of the combustion engine; and, a setting device configured to permit an operator of the work apparatus to set the engagement rotational speed ($n_{E2}$).

The engagement speed of the combustion engine is the speed at which the control device engages in order to limit the speed of the combustion engine. The speed can climb over the engagement speed during operation. However, above the engagement speed, the control device takes measures to limit the speed. On account of the fact that the engagement speed for setting the speed of the combustion engine can be changed by the user, it is possible to easily set the speed. Usually, the throttle lever acts on a throttle flap which controls the amount of combustion air supplied. If the throttle lever is only half actuated, the throttle flap is also only half open. In partial load operation, that is to say with the throttle flap only partially opened, speed fluctuations occur in the event of a load change. Therefore, it is desirable to operate the combustion engine at full throttle, that is to say with the throttle flap fully open.

Since it is possible for the user to set the engagement speed, continuous operation at full throttle, that is to say with the throttle element fully open, is possible even at a reduced speed. The user can keep the throttle lever fully pressed continuously, and so it is possible to work comfortably. The adjustment of the engagement speed causes a displacement of the upper branch of the engine characteristic curve. As a result, the same engine performance is achieved for every engagement speed set. This engine performance corresponds co the performance of a combustion engine at the usually fixedly predetermined engagement speed. Since the engine is operated at full throttle, changes in the load result in only comparatively small speed fluctuations, and as a result work can be carried out comfortably and effectively. Load changes are compensated by the control means, which regulates the engine less at a greater load and regulates it more at a smaller load. However, it can also be desirable to limit the speed at half throttle, that is to say with the throttle element partially open. This can be advantageous in particular to reduce noise.

The means for setting the engagement speed can be operated in particular without tools. The means for setting the engagement speed are actuable in particular during operation of the combustion engine. As a result, the engagement speed can be set during operation. Advantageously, the user will set the desired speed with the throttle lever during operation. If the work apparatus is for example a harvester, the user will regulate the speed with the throttle lever so as to produce a desired shaking frequency of the harvester. If the means for setting the engagement speed, for example a control element such as a button or the like, are then actuated, the instantaneous speed is advantageously fixed as the engagement speed.

It can also be provided for the means for setting the engagement speed to be formed by a predetermined manner of operating the work apparatus. Advantageously, the work apparatus has a control device which automatically adapts the engagement speed when the user operates the work apparatus in the predetermined manner. This can take place for example by the work apparatus being operated at the same speed for a predetermined period of time. Advantageously, this same speed is fixed as the engagement speed. Once it has been set, an engagement speed can likewise be changed by a predetermined manner of operation, for example by a predetermined order of operating steps being carried out.

Advantageously, the work apparatus has a control element for setting the engagement speed. The control element can be for example a selector element such as a rotary switch that acts on a rotary potentiometer or the like, via which the desired speed can be set in an easy manner. However, it is also possible to provide a switch by way of which it is possible to switch over between two engagement speeds. The control element can be operated easily by the user. The set engagement speed can be retained even when the combustion engine is switched off, such that it is not necessary to set the speed again upon each start. The engagement speed can be set in particular in a continuously variable manner. The setting of the engagement speed can also take place in the manner of a cruise controller in motor vehicles, for example in that the user sets a desired speed by actuating the throttle lever and fixes this speed as the engagement speed by actuating a control element. In order to change or delete the fixed engagement speed, it is possible for example for a further control element, of a predetermined sequence of operating steps to be provided.

In order that the user can actuate the means for setting the engagement speed during operation of the combustion engine, it is provided for the means for setting the engagement speed to be arranged on the handle or immediately next to the handle. The means for setting the engagement speed are intended to be arranged in this case such chat the user can hold the handle and use the handle to carry the weight of the work apparatus and at the same time actuate the means for setting the engagement speed. Advantageously, two handles are provided, wherein the throttle lever for operating the combustion engine is arranged on one of the handles. In particular, means for setting the engagement speed are arranged on the handle or immediately next to the handle on which the throttle lever is also arranged. The means for setting the engagement speed are arranged in particular such that a user can hold the handle, actuate the throttle lever and actuate the means for setting the engagement speed at the same time with one hand. Advantageously, the means for setting the engagement speed, are arranged next, to the throttle lever. It may also be advantageous to arrange the means for setting the engagement speed on a housing of the work apparatus next to the throttle lever. The means are advantageously arranged in this case such that a user can actuate the throttle lever and the means for setting the engagement speed at the same time with one hand.

Advantageously, the control device for limiting the speed acts on the ignition device. In this case, the control device can suspend ignition in at least some of the engine cycles, that is to say desynchronize the engine. The term "desynchronization" is understood in this case to mean operation of the combustion engine in which the combustion engine is controlled by suspending ignition deliberately such that, combustion does not take place during each engine cycle. An engine cycle corresponds in this case to one revolution of the crankshaft in two-stroke engines and to two revolutions of the crankshaft in four-stroke engines. In addition or alternatively, the control device can adjust the ignition point. In this case, it can foe advantageous to adjust the ignition point to "early" or "late".

Advantageously, the control device also controls the amount of fuel supplied. In order to limit the speed, it is provided in particular for the control device to change the amount of fuel, supplied. In this case, in order to limit the speed, it may be advantageous to make the mixture supplied richer or leaner. It may also be advantageous to suspend the fuel supply for individual or several engine cycles and as a result regulate the engine. The term "regulate" is understood to mean any measure for reducing or limiting the engine speed, in particular suspending ignition, adjusting the ignition point, interrupting the supply of fuel, changing the amount of fuel supplied and any combination of these measures. In particular, a combination of said measures is provided to limit the speed.

Above the engagement speed, it is also possible to provide different speed ranges, in which different measures for regulation are taken. In particular, above the engagement speed, in the event of a further increase in speed, ignition is desynchronized initially in a first speed range. Accordingly, ignition does not take place in each engine cycle and accordingly combustion does not take place in each engine cycle. In the event of a further increase in the speed, it is advantageously provided, in a second speed range located above the first speed range, for the fuel supply additionally to be switched off. In all of the abovementioned measures for limiting the speed, the position of the throttle flap remains the same. If the engine load changes at full throttle, that is to say while the engine is being operated above the engagement speed, then the regulation of the combustion engine by the control device is automatically adapted in a corresponding manner. For example, the desynchronization rate, the amount of fuel supplied or the ignition point is changed such that the speed can be kept substantially constant. The desynchronization rate denotes in this case the ratio of the engine cycles without ignition in a period of time divided by the overall number of engine cycles in this period of time. In partial load, no regulation of the engine usually takes place below the engagement speed, and so the position of the throttle flap has to be changed in the event of a change in the load. However, in combustion engines of simple construction, as are used for example in handheld work apparatuses, this is usually only possible by way of the user and not automatically.

Advantageously, the work apparatus has a carburetor in which a throttle element is arranged, in particular mounted in a rotatable manner, wherein the fuel in the carburetor is supplied via at least one fuel opening. It is possible for the amount of fuel supplied to be controlled in an easy manner in that the fuel is supplied via a metering valve which is controlled by the control means. In this case, it is possible to control the amount of fuel supplied in a precise manner in terms of the engine cycle. Metering of fuel in a precise manner in terms of the engine cycle is possible in an easy manner in particular when fuel is supplied directly into the crankcase or into a transfer channel of the combustion engine.

Advantageously, the combustion engine has a throttle element for controlling the amount of combustion air supplied. The means for setting the engagement speed advantageously also act on the throttle element. This is particularly advantageous in order to achieve a predetermined operating state automatically by actuating the means for setting the engagement speed. This is in particular an operating state for quiet operation, in which the throttle element is only partially open. In order to limit the speed, the ignition point is advantageously adjusted to "early" or "late". In this case, it is advantageously only possible to set a fixedly predetermined engagement speed for quiet operation. It can be provided, for a first means for setting a plurality of engagement speeds by the user to be provided and a second means for setting a specific engagement speed for quiet operation, the throttle element being adjusted at the same time as the actuation of said, second means and the speed being limited when said second means is actuated only by adjusting the ignition point and not by desynchronization or by changing the amount of fuel supplied.

Advantageously, the work apparatus has a housing. The means for setting the engagement speed are advantageously arranged outside the housing. As a result, the user can operate the means for setting the engagement speed comfortably. Advantageously, the user can operate the means for setting the engagement speed without having to let go for example of a handle on which an actuating element, in particular a throttle lever, for the combustion engine is arranged. This results in an ergonomic arrangement. The means for setting the engagement speed advantageously project beyond the outer contour of the housing. As a result, the means for setting the engagement speed are easily accessible for the user.

BRIEF DESCRIPTION OP THE DRAWINGS

The invention will now be described with reference to the drawings wherein.

DESCRIPTION OF THE PREFERRED EMBODIMENTS OF THE INVENTION

Figure 1:
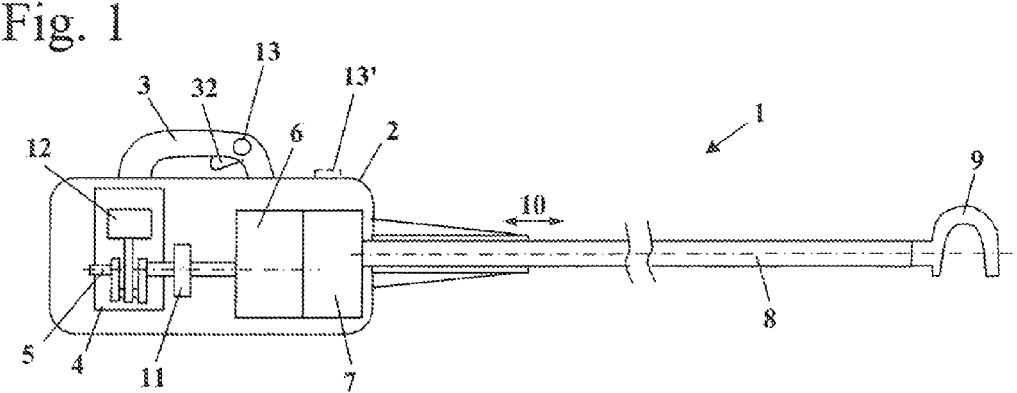
FIG. 1 is a schematic of a harvester.

FIG. 1 shows a harvester 1, specifically an olive shaker, as an exemplary embodiment of a handheld work apparatus. However, setting the speed may also be advantageous in other handheld work apparatuses, for example in cutoff machines, brush cutters, hedge trimmers, chain saws or blowers in order to adapt to the tool in question and/or to the work assignment in question.

The harvester 1 has a housing 2, on which a handle 3 is arranged. Advantageously, the harvester 1 is guided during operation via the handle 3 shown and a further handle, which is not shown. A throttle lever 32 is mounted pivotably on the handle 3. Arranged in the housing 2 is a combustion engine 4, which is in the form of a two-stroke engine. However, the combustion engine 4 can also be a four-stroke engine, in particular a mixture-lubricated four-stroke engine. The combustion engine 4 is a single-cylinder engine. The combustion engine 4 has a piston 12, which drives a crankshaft 5 in rotation. The crankshaft 5 drives, via a clutch 11, a transmission 6 and a crank drive 7, a shaking rod 8 back and forth in the direction of the arrow 10. The clutch 11 is in particular a centrifugal clutch. Arranged on the shaking rod 8 is a hook 9, which forms the tool of the harvester and by way of which branches of a tree or bush to be harvested can be grasped. For example, in the harvesting of olives, it is advantageous to adapt the shaking frequency to the degree of ripeness of the fruit to be shaken and the strength of the branch. To this end, a switch 13 is provided. In the exemplary embodiment, the switch 13 is arranged on the handle 3, specifically in the immediate spatial vicinity of the throttle lever 32. The switch 13 is advantageously arranged in such a way that the switch 13 can be actuated for example with the thumb, while the throttle lever 32 is actuated by the index finger. As a result, the user can actuate the switch 13 and at the same time guide the harvester 1 with both hands. The switch 13 can in this case act advantageously on a rotary potentiometer or be in the form of a button. In particular, the user uses the throttle lever 32 to set a desired speed, which creates for example a desired frequency for shaking a tree. When the desired speed has been reached, the user actuates the switch 13. Advantageously, the instantaneous speed of the combustion engine 4 is fixed as the engagement speed when the switch 13 is actuated. The engagement speed is the speed above which a control device of the work apparatus engages, in order to limit the speed. The speed can accordingly rise above the engagement speed during operation, but the combustion engine 4 is regulated above the engagement speed. In order to delete an engagement speed once it has been set, a further switch can be provided. Alternatively, a predetermined order of operating steps can delete a set engagement speed.

Instead of the switch 13 on the handle 3, a switch 13' can be arranged on the housing 2. The switch 13 is arranged on the outside of the housing 2, in the immediate vicinity of the handle 3 and the throttle lever 32, so that the switch 13 can be operated comfortably by the user. The switch 13' is advantageously likewise arranged such that the user can hold the handle 3 with one hand and can actuate the throttle lever 32 and the switch 13' at the same time. The switch (13, 13') can also be arranged such that it can be actuated with the other hand, which is not on the handle 3.

The switch (13, 13') can be in the form for example of a rotary switch, which acts on a rotary potentiometer and by way of which the engagement speed can be set in a continuously variable manner or in structurally predetermined latching steps. However, the switch (13, 13') can also have only two latching positions, so that it is possible to use the switch (13, 13') to switch over between two engagement speeds, advantageously a maximum engagement speed and a reduced engagement speed. The switch (13, 13') projects beyond the outer contour of the housing 2 and can be operated from outside without a tool, that is to say without a screwdriver or the like.

Figure 2:
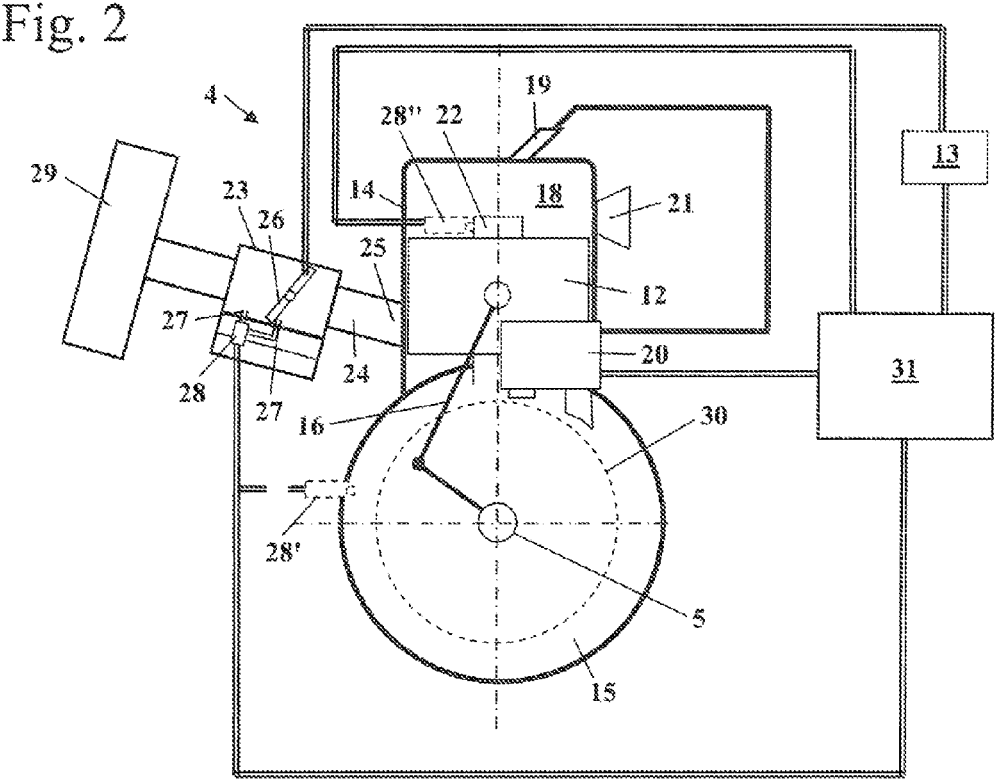
FIG. 2 is a schematic of the combustion engine of the harvester from FIG. 1.

FIG. 2 shows the structure of the combustion engine 4 in detail. The combustion engine 4 has a cylinder 14, in which the piston 12 is mounted in a reciprocating manner. The cylinder 14 and the piston 12 delimit a combustion chamber 18, into which a spark plug 19 projects. An outlet 21 for exhaust gases leads out of the combustion chamber 18. The piston 12 drives the crankshaft 5 via a connecting rod 16. The crankshaft 5 is mounted rotatably in a crankcase 15. The crankshaft 5 is advantageously connected to a flywheel 30 so as to rotate therewith, one or more pole groups, which are not shown in FIG. 2, being arranged on the flywheel 30. The flywheel 30 can also be in the form of a fan wheel. Arranged on the outer periphery of the flywheel 30 is an ignition module 20, which has at least one coil, in which the pole groups on the flywheel 30 induce a voltage which is used to ignite the spark plug 19. The ignition module 20 is connected to a control device 31 which controls or regulates the ignition point.

The combustion engine 4 has an intake duct 24, which opens into the crankcase 15 by way of an inlet 25 which is slot-controlled by the piston 12. The intake duct 24 draws in combustion air via an air filter 29. A part of the intake duct 24 is formed in a carburetor 23. A throttle flap 26 is mounted pivotably in the carburetor 23. In addition, a choke flap, not shown, can be provided upstream of the throttle flap 26. In the region of the throttle flap 26, fuel openings 27 open into the intake duct 24, it being possible for fuel to be drawn into the intake duct 24 via these fuel openings 27 depending on the negative pressure prevailing in the region of the throttle flap 26. The amount of fuel, supplied to the fuel openings 27 is controlled by a metering valve 28, which is controlled by the control device 31. Instead of supplying the fuel into the carburetor 23, a direct supply of fuel into the crankcase 15 via a metering valve 28' or into a transfer channel 22 via a metering valve 28" can also be provided. The transfer channel 22 connects the crankcase 15 to the combustion chamber 18 in the region of the bottom dead center of the piston 12.

During operation, air/fuel mixture is drawn into the crankcase 15 in the region of the top dead center of the piston 12 and is compressed in the crankcase 15 during the downward stroke of the piston 12. In the region of the bottom dead center of the piston 12, air/fuel mixture flows out of the crankcase 15 and into the combustion chamber 18 via one or more transfer channels 22 and is ignited in the combustion chamber 18 by the spark plug 19 in the region of the top dead center of the piston 12. During the downward stroke of the 18 through the outlet 21.

The carburetor 23 has one or more setting means, for example set screws, via which the amount of fuel supplied can be set. Setting at the carburetor 23 is presetting, which is carried out during manufacture or during service. It is also possible for setting to be carried out by the user. The carburetor 23 is set in this case by way of tools, in particular by way of a screwdriver or by way of special tools.

Figure 3:
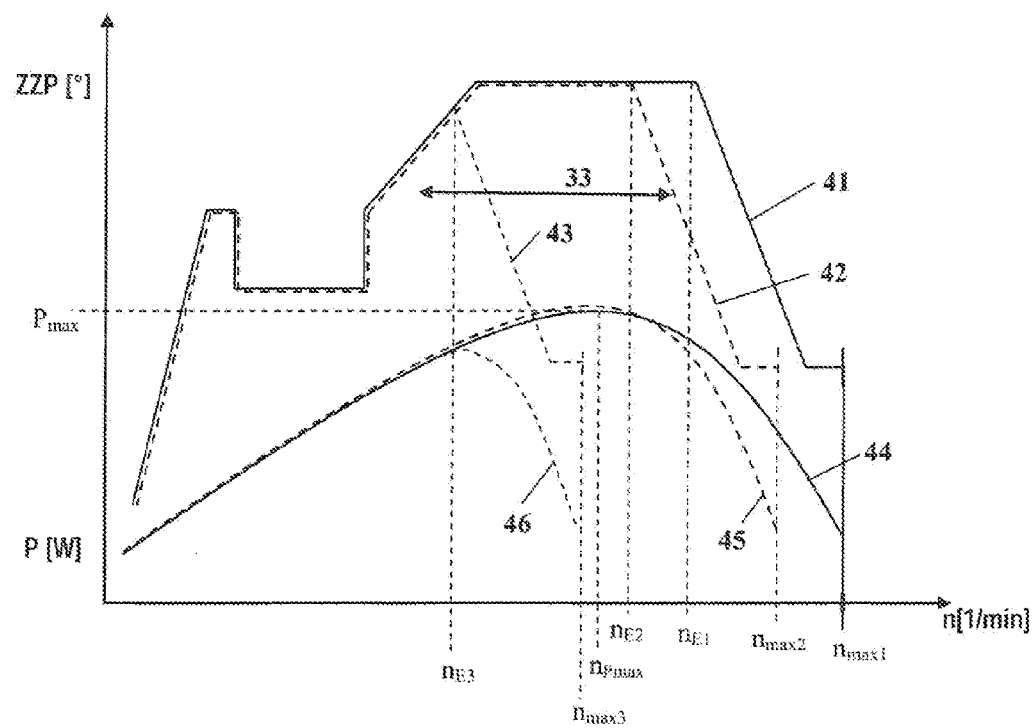
FIG. 3 is a diagram which indicates the ignition point as a function of the speed.

FIG. 3 shows the profile of the ignition point ZZP and the output P of the combustion, engine 4 as a function of the speed (n). The ignition point ZZP is changed, as the curves 41, 42 and 43 show, depending on the speed (n) of the combustion engine 4. In FIG. 3, the ignition point ZZP is given in degrees crankshaft angle before top dead center. Usually, the speed (n) is regulated by the control device 31 in the range of an engagement speed $n_{E1}$, which is around 9000 revolutions/minute in the exemplary embodiment. To this end, the ignition point ZZP is adjusted above the engagement speed $n_{E1}$ in the direction of top dead center, that is, toward "late", as the curve 41 shows. In this case, the speed can rise above the engagement speed $n_{E1}$ into the regulating range located above the engagement speed $n_{E1}$. The engagement speed $n_{E1}$ is the speed at which the control device 31 engages in order to prevent the speed from rising excessively. In addition or alternatively, it can also be provided to suspend ignition above the engagement speed $n_{E1}$, for example in accordance with a predetermined desynchronization pattern for individual engine cycles. The expression "desynchronization pattern" designates in this case the pattern in which engine cycles having ignition and engine cycles without ignition follow one another. It can also be provided to switch off ignition completely. The output P that results when the ignition point ZZP is controlled according to the curve 41 is shown by the curve 44. The maximum output $P_{max}$ results at a speed $n_{Pmax}$ which is below the engagement speed $n_{E1}$.

The switch (13, 13') can be used to adjust the engagement speed $n_{E1}$, for example to the engagement speed $n_{E2}$ shown in FIG. 3. Adjustment is possible over a wide operating range, as is indicated schematically by the double arrow 33. The adjustment of the engagement speed $n_{E1}$ has the effect that the control device 31 already engages to limit the speed at a lower engagement speed below the engagement speed $n_{E1}$, which corresponds to the maximum engagement speed. If the engagement speed $n_{E1}$ is adjusted for example to the lower engagement speed $n_{E2}$, then the control device 31 already engages at the engagement speed $n_{E2}$ to limit the speed. The maximum engagement speed corresponds to the engagement speed usually set for limiting the speed in combustion engines, the engagement speed of which is not adjustable. The maximum engagement speed is at the same time the maximally settable engagement speed. For regulating down, the ignition point ZZP is controlled in accordance with the curve 42. The throttle lever 32 can remain fully pressed by the user at the engagement speed $n_{E2}$, and so the throttle flap 26 is fully open, and thus the combustion engine 4 is operated at full throttle. The engagement speed ($n_{E1}$, $n_{E2}$, $n_{E3}$) can be set during operation and without tools and should be distinguished from the setting of the carburetor 23, which is a basic setting and should not be carried out during operation. The setting of the carburetor 23 acts on the carburetor itself and directly influences the amount of fuel supplied, while the setting of the engagement speed ($n_{E1}$, $n_{E2}$, $n_{E3}$) acts on the control device 31 and influences the engagement speed $n_{E1}$ stored in the control device. The changing of the engagement speed brings about a change in the control of the combustion engine 4 advantageously only above the engagement speed.

When the engagement speed $n_{E2}$ is exceeded, the speed (n) is regulated by the control device 31 in a predetermined manner. In the regulating range above the engagement speed $n_{E2}$, the combustion engine 4 is controlled by adjusting the ignition point ZZP or suspending ignition and/or by changing the amount (x) of fuel supplied or interrupting the fuel supply such that the speed (n) does not rise above the regulating range. The curve 45 shows the profile of the output P when the ignition point is controlled in accordance with the curve 42, that is, is adjusted to "late" above the engagement speed $n_{E2}$. The output P drops more steeply above the engagement speed $n_{E2}$ than in the case of control of the ignition point ZZP in accordance with the curve 41. Since the engagement speed $n_{E2}$ is also located above the speed $n_{Pmax}$, at which the maximum output P is achieved, the maximum output $P_{max}$ is also achieved in the case of control of the ignition point ZZP in accordance with the curve 42.

The engagement speed $n_E$ can also be adjusted to an engagement speed $n_{E3}$, illustrated by way of example, which is below the speed $n_{Pmax}$ at maximum engine output. At the engagement speed $n_{E3}$, the ignition point ZZP is adjusted to "early" when not yet at a maximum, as a result of which the speed (n) would rise further. If the engagement speed were set at a higher value, then the ignition point ZZP would still be adjusted to "early" with the speed (n) continuing to rise. If the engagement speed $n_{E3}$ is set at a speed below the speed $n_{Pmax}$ at maximum output, the maximum engine output $P_{max}$ is not achieved, but rather the output drops in accordance with the curve 46 as soon as the engagement speed $n_{E3}$ is reached. It can be advantageous to set a lower engagement speed ($n_{E2}$, $n_{E3}$) even at partial load, that is, partially open throttle flap 26, for example in order to influence the noise generated by the combustion engine 4. The regulating range extends in this case from the engagement speed ($n_{E1}$, $n_{E2}$, $n_{E3}$) set in each case to the associated maximum speed ($n_{max1}$, $n_{max2}$, $n_{max3}$). The maximum, speed ($n_{max1}$, $n_{max2}$, $n_{max3}$) is the speed of the combustion engine 4, above which the speed cannot rise at the engagement speed ($n_{E1}$, $n_{E2}$, $n_{E3}$) set in each case. The maximum speeds ($n_{max1}$, $n_{max2}$, $n_{max3}$) can, as shown in FIG. 3, be different. However, it can also be provided for the speeds ($n_{max1}$, $n_{max2}$, $n_{max3}$) to be the same, that is, that, regardless of the engagement speed ($n_{E1}$, $n_{E2}$, $n_{E3}$) set in each case, the same maximum speed ($n_{max1}$, $n_{max2}$, $n_{max3}$) is reached. This can be achieved by correspondingly differently shaped characteristic curves between the engagement speeds ($n_{E1}$, $n_{E2}$, $n_{E3}$) and the associated maximum speeds ($n_{max1}$, $n_{max2}$, $n_{max3}$).

Figure 4:
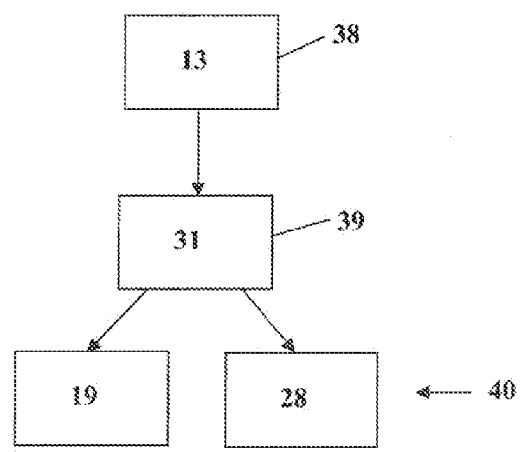
FIG. 4 is a schematic of the sequence of speed setting.

FIG. 4 schematically illustrates the effect of adjusting the engagement speed. In method step 38, an engagement speed $n_{E2}$ is set by the user via the switch 13. This engagement speed $n_{E2}$ is transmitted in method step 39 to the control device 31, which, in method step 40, controls the spark plug 19 and/or the metering valve 28 such that the speed (n) is limited above the engagement speed nE2 set by the user. Accordingly, the engagement speed $n_{E2}$ does not indicate the maximum engine speed but rather the speed at which the control device 31 engages in order to limit the speed. The control device 31 can in this case suspend the fuel supply to individual engine cycles, completely switch off the fuel supply or increase or decrease the amount (x) of fuel supplied per engine cycle. A combination of these measures, for example interruption of the fuel supply in some engine cycles and supply of a reduced or increased amount of fuel in other engine cycles, can also be provided. In addition or alternatively, the ignition point ZZP can be adjusted and/or the ignition suspended in individual engine cycles, that is, the ignition is desynchronized such that, the combustion engine 4 is regulated.

Figure 5:
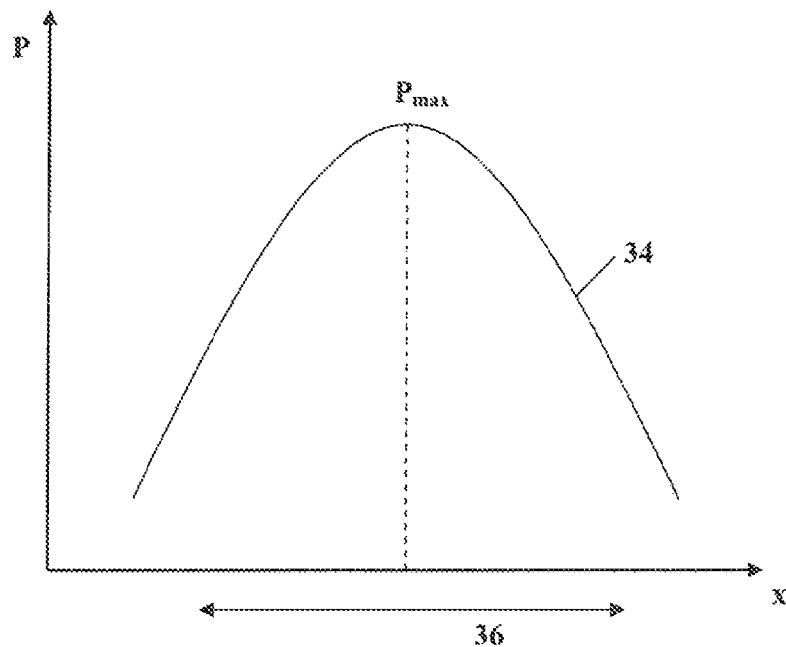
FIG. 5 is a diagram which indicates the engine output depending on the amount of fuel supplied at a constant ignition point; and, FIG. 6 is a diagram which indicates the profile of the engine output as a function of the ignition point at a constant amount of fuel supplied.

FIG. 5 schematically shows the profile of the engine output P as a function of the amount (x) of fuel supplied. The profile of the output P has the shape of a downwardly open parabolic curve 34. The curve 34 has a maximum, which corresponds to the maximum output $P_{max}$. By increasing or decreasing the amount of fuel supplied, the output P and thus also the speed (n) of the combustion engine 4 can be decreased. The possible regulating range 36 is likewise plotted in FIG. 5. The curve 34 indicates the profile of the output P at a constant ignition point ZZP.

Figure 6:
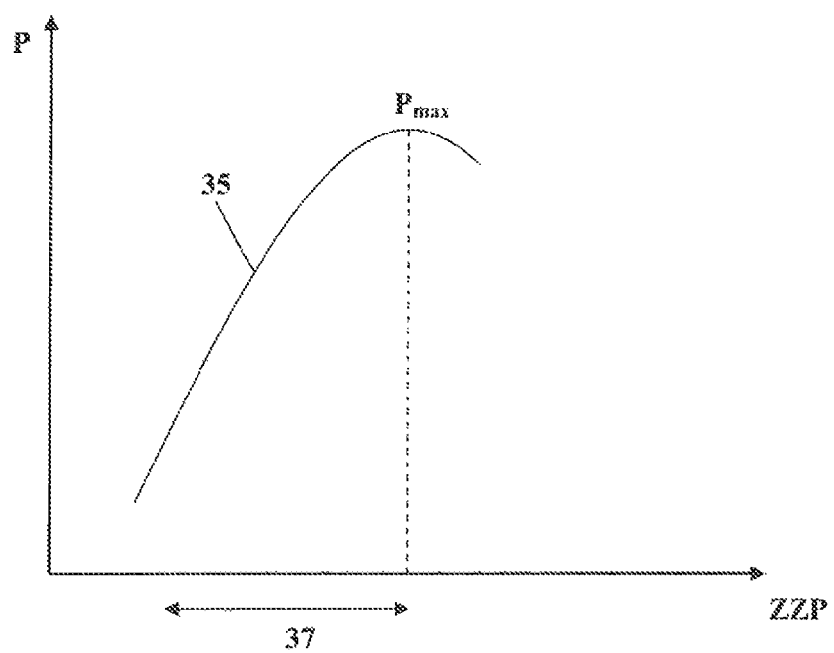

FIG. 6 shows the profile of the output F at a constant amount (x) of fuel supplied and a changed ignition point ZZP by way of a curve 35. The curve 35 has a maximum. At later ignition points ZZP, the output P is decreased. The possible adjustment of the ignition point ZZP is illustrated as the regulating range 37. The regulating range 37 extends from the ignition point ZZP at the maximum output $P_{max}$ to earlier ignition points ZZP. Also, by changing the ignition point ZZP, the engine output P and thus the speed (n) of the combustion engine 4 can accordingly be changed.

It may be advantageous, to adjust the position of the throttle flap 26 at the same time as adjusting the engagement speed $n_{E2}$. This may be particularly advantageous in order to set a quiet operating mode. By way of the switch (13, 13'), the user can thus select a quiet operating mode in which the throttle flap is only partially open and at which the speed is already limited at an engagement speed $n_{E2}$ which is under the maximum speed $n_{A1}$ of the combustion engine 4. The throttle flap 26 is adjusted in this case advantageously when the switch (13, 13') is actuated. This is illustrated schematically in FIG. 2. It may also be advantageous to provide a plurality of switches (13, 13'), wherein one of the switches (13, 13') is provided, to set quiet operation, this switch (13, 13') only making it possible to switch over between normal operation and quiet operation. This switch (13, 13') acts in this case advantageously also on the throttle flap 26 and prevents the throttle flap 26 from opening fully. At the same time, it is advantageous for quiet operation to limit the speed by simply adjusting the ignition point to "early" or "late". Desyncnronization, that is, suspension of ignition, or changing the amount of fuel supplied is not provided for this operating mode. The engagement speed $n_{E2}$ can be set in a variable, in particular continuously variable, manner via a second switch (13, 13') which can be in the form of a rotary switch.

It can also be provided for the engagement speed to be able to be set by the user as per the speed setting in a cruise controller in motor vehicles. The user sets a desired speed, for example with the throttle lever 32, and then actuates a control element, for example a switch (13, 13'), control knob or button, during operation of the combustion engine 4. As a result, the instantaneous speed is fixed as the engagement speed. The speed can be cleared for example by a further control element, by reactuating the control element for fixing the engagement speed, by carrying out a predetermined sequence of operating steps, or the like.

The control element, for example the switch (13, 13'), a control knob or button is in this case advantageously arranged such that the user can hold the handle 3 with one hand and can actuate the throttle lever 32 and the control element at the same time with this hand.

Alternatively, it is possible to provide electronics which—expediently integrated into the control device 31—trigger automatic adaptation of the engagement speed $n_E$. For example, if the user is operating a work apparatus such as the harvester 1 at a largely identical speed over a predetermined period of time, the electronics causes this identical speed to be stored as the engagement speed $n_E$.

The automatic adaptation of the engagement speed $n_E$ can be continuously active. If the user operates the harvester 1 at a different working speed for a predetermined period of time, then the electronics again cause the current engine speed to be adopted as a new engagement speed $n_E$. The speed can be cleared by actuating a control element, for example a switch (13, 13'), a button, a control knob, or the like, or by the execution of a predetermined sequence of operating steps.

Alternatively or in addition, the automatic adaptation of the engagement speed $n_E$ and/or the deletion of a set engagement speed $n_E$ can take place depending on the signal from a sensor, for example depending on the signal from a rotation rate sensor, pressure sensor, temperature sensor, capacitive and/or inductive sensor, or the like.

It is understood that the foregoing description is that of the preferred embodiments of the invention and that various changes and modifications may be made thereto without departing from the spirit and scope of the invention as defined in the appended claims.

What is claimed is:

1. A portable hand-guided work apparatus comprising:
a tool;
a combustion engine for driving said tool; and,
said combustion engine including a combustion chamber and a piston delimiting said combustion chamber;
a spark plug projecting into said combustion chamber;
a crankshaft rotatably driven by said piston;
a centrifugal clutch;
said crankshaft being configured to drive said tool via said centrifugal clutch;
an ignition device for controlling the ignition time point of said spark plug;
a supply unit for supplying fuel; and,
a control unit;
said control unit being configured to initiate measures to limit the rotational speed (n) of said combustion engine upon reaching an engagement rotational speed ($n_{E1}$, $n_{E2}$) stored in said control unit;
said engagement rotational speed ($n_{E1}$, $n_{E2}$) being a rotational speed whereat said tool is driven by said crankshaft via said centrifugal clutch;
said engagement rotational speed ($n_{E2}$) stored in said control unit can be shifted by an operator via a setting device;
said combustion engine having an engine characteristic line having an upper branch and said engine characteristic line defining the power of said combustion engine in dependence upon the rotational speed thereof; and,
wherein the shift of said engagement rotational speed ($n_{E2}$) effects an adjustment of the upper branch of said engine characteristic line.

2. The portable hand-guided work apparatus of claim 1, wherein said setting device is configured to be actuable during operation of said combustion engine.

3. The portable hand-guided work apparatus of claim 2, wherein an instantaneous rotational speed is set as said engagement rotational speed ($n_{E2}$) when said setting device is actuated.

4. The portable hand-guided work apparatus of claim 1, wherein said setting device includes an operator-controlled element to permit the operator to set said engagement rotational speed ($n_{E2}$) to said desired engagement rotational speed.

5. The portable hand-guided work apparatus of claim 1, further comprising a handle to permit the operator to hold said work apparatus; and, said setting device being mounted on said handle or directly adjacent thereto.

6. The portable hand-guided work apparatus of claim 1, further comprising a throttle lever; and, said setting device being mounted adjacent to said throttle lever.

7. The portable hand-guided work apparatus of claim 1, wherein said control unit is configured to operate on said ignition device to limit said rotational speed (n).

8. The portable hand-guided work apparatus of claim 7, wherein said control unit is configured to suppress the ignition for at least a portion of the engine cycle.

9. The portable hand-guided work apparatus of claim 7, wherein said control unit is configured to shift the ignition point (ZZP).

10. The portable hand-guided work apparatus of claim 1, wherein said control unit is configured to control a metered fuel quantity (x) and to change said metered fuel quantity (x) to limit said rotational speed (n).

11. The portable hand-guided work apparatus of claim 10, wherein said fuel-metering device comprises a carburetor having at least one fuel opening through which the fuel in the carburetor is metered.

12. The portable hand-guided work apparatus of claim 10, wherein said fuel-metering device has a metering valve through which the fuel is metered; and, said control unit is configured to control said metering valve.

13. The portable hand-guided work apparatus of claim 1, wherein said combustion engine includes a throttle element to control the supplied combustion air quantity; and, said setting device is configured to operate on said throttle element.

14. The portable hand-guided work apparatus of claim 1, further comprising a housing; and, said setting device being mounted outside of said housing.

15. The portable hand-guided work apparatus of claim 1, further comprising a housing; and, said setting device being arranged so as to project beyond the outer contour of said housing.

16. A portable hand-guided work apparatus comprising:
a tool;
a combustion engine for driving said tool;
said combustion engine having an ignition device, a fuel-metering device and a control unit;
said combustion engine including a crankshaft and a piston operatively connected to said crankshaft for imparting rotational movement thereto;
a centrifugal clutch;
said crankshaft being connected to said tool via said centrifugal clutch to drive said tool;
said control unit being configured to operate on said ignition device and to control a metered fuel quantity (x);
an engagement rotational speed ($n_{E1}$, $n_{E2}$) stored in said control unit;
said control unit being configured to intervene when the rotational speed (n) of said combustion engine reaches said engagement rotational speed ($n_{E1}$, $n_{E2}$) by operating on said ignition device and/or by changing said metered fuel quantity to limit the rotational speed (n) of said combustion engine; and,
a setting device configured to permit an operator of said work apparatus to change said engagement rotational speed ($n_{E2}$) stored in said control unit.

17. The portable hand-guided work apparatus of claim 16, further comprising a throttle lever; and, said setting device being mounted adjacent said throttle lever.

18. The portable hand-guided work apparatus of claim 1, wherein said setting device is operable by the operator without tools.

19. A portable hand-guided work apparatus comprising:
a tool;
a combustion engine for driving said tool; and,
said combustion engine including a combustion chamber and a piston delimiting said combustion chamber;
a spark plug projecting into said combustion chamber;
a crankshaft rotatably driven by said piston;
a centrifugal clutch;
said crankshaft being configured to drive said tool via said centrifugal clutch;
an ignition device for controlling the ignition time point of said spark plug;
a supply unit for supplying fuel; and,
a control unit;
said combustion engine having an engine characteristic line having an upper branch and said engine characteristic line defining the power of said combustion engine in dependence upon the rotational speed thereof;
said control unit being configured to initiate measures to limit the rotational speed (n) of said combustion engine upon reaching an engagement rotational speed ($n_{E1}$, $n_{E2}$) stored in said control unit;
said engagement rotational speed ($n_{E1}$, $n_{E2}$) being a rotational speed whereat said tool is driven by said crankshaft via said centrifugal clutch;
wherein an adjustment of said engagement rotational speed ($n_{E2}$) effects an adjustment of said upper branch of said engine characteristic line; and,
a unit for automatically adapting said engagement rotational speed ($n_{E2}$) stored in said control unit which assumes the current engine rotational speed as said engagement rotational speed ($n_{E2}$).

20. The portable hand-guided work apparatus of claim 19, wherein the assumption of the current engine rotational speed as said engagement rotational speed ($n_{E2}$) takes place in dependence upon at least one of the following: a signal of a sensor of said work apparatus and when said work apparatus is operated at substantially the same rotational speed over a predetermined time span.

* * * * *

UNITED STATES PATENT AND TRADEMARK OFFICE
CERTIFICATE OF CORRECTION

| | |
|---|---|
| PATENT NO. | : 9,797,319 B2 |
| APPLICATION NO. | : 13/758607 |
| DATED | : October 24, 2017 |
| INVENTOR(S) | : M. Dangelmaier et al. |

It is certified that error appears in the above-identified patent and that said Letters Patent is hereby corrected as shown below:

In Column 2:
Line 10: delete "co" and substitute -- to -- therefor.

In Column 3:
Line 4: delete "chat" and substitute -- that -- therefor.
Line 30: delete "," after "that".
Line 36: delete "foe" and substitute -- be -- therefor.

In Column 4:
Line 61: delete "OP" and substitute -- OF -- therefor.

In Column 5:
Line 18: delete "brush cutters" and substitute -- brushcutters -- therefor.

In Column 6:
Line 66/67: delete "During the downward stroke of the 18 through the outlet 21." and substitute -- During the downward stroke of the piston 12, the exhaust gases leave the combustion chamber 18 through the outlet 21. -- therefor.

In Column 8:
Line 56: delete "nE2" and substitute -- $n_{E2}$ -- therefor.

In Column 9:
Line 2: delete "," after "that".
Line 14: delete "F" and substitute -- P -- therefor.
Line 36: delete "," after "provided".
Line 43: delete "Desyncnronization" and substitute -- Desynchronization -- therefor.

Signed and Sealed this
First Day of May, 2018

Andrei Iancu
*Director of the United States Patent and Trademark Office*